United States Patent
Hasan et al.

(10) Patent No.: US 12,006,471 B2
(45) Date of Patent: Jun. 11, 2024

(54) NANOBUBBLES AND GAS-LIQUID MIXTURES FOR ENHANCED CARBON DIOXIDE SEQUESTRATION

(71) Applicant: Protostar Group Ltd., London (GB)

(72) Inventors: Talal Hasan, Muscat (OM); Ehab Tasfai, Muscat (OM); Juerg Matter, Southampton (GB)

(73) Assignee: Protostar Group Ltd., London (GB)

( * ) Notice: Subject to any disclaimer, the term of this patent is extended or adjusted under 35 U.S.C. 154(b) by 83 days.

(21) Appl. No.: 17/932,363

(22) Filed: Sep. 15, 2022

(65) Prior Publication Data
US 2023/0235214 A1  Jul. 27, 2023

Related U.S. Application Data

(60) Provisional application No. 63/303,060, filed on Jan. 26, 2022.

(51) Int. Cl.
*E21B 41/00* (2006.01)
*C09K 8/594* (2006.01)

(52) U.S. Cl.
CPC .......... *C09K 8/594* (2013.01); *C09K 2208/10* (2013.01)

(58) Field of Classification Search
CPC ....................................................... E21B 41/00
See application file for complete search history.

(56) References Cited

U.S. PATENT DOCUMENTS

| | | | |
|---|---|---|---|
| 2011/0174507 A1* | 7/2011 | Burnham | E21B 41/0064 166/402 |
| 2020/0316515 A1 | 10/2020 | Arkadakskiy et al. | |
| 2021/0261451 A1* | 8/2021 | Patton | E21B 41/0064 |
| 2022/0219112 A1* | 7/2022 | Sigfússon | B01D 53/62 |

OTHER PUBLICATIONS

Extended European Search Report dated Jun. 6, 2023, in European Patent Application No. 22212866.2 (11 pages).
Suguru Uemura et al., Injection of nanosized $CO_2$ droplets as a technique for stable geological sequestration, International Journal of Greenhouse Gas Control, Elsevier, Amsterdam, NL, vol. 45, Dec. 22, 2015, pp. 62-69, XP029394594.
Ahmed Khaled Abdella Ahmed et al., Generation of nanobubbles by ceramic membrane filters: The dependence of bubble size and zeta potential on surface coating, pore size and injected gas pressure, Chemosphere, Pergamon Press, Oxford, GB, vol. 203, Mar. 28, 2018, pp. 327-335, XP085383476.
Vyacheslav Romanov et al., Mineralization of Carbon Dioxide: A Literature Review, ChemBioEng Review, John Wiley & Sons, Inc. Hoboken, USA, vol. 2, No. 4, May 11, 2015, pp. 231-256, XP072274568.

* cited by examiner

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

The present invention discloses a novel process for the mineralization of $CO_2$ in mafic and ultramafic rocks or storage of $CO_2$ in geological formations through the generation and use of nano-sized $CO_2$ bubbles injected into a fluid-mixture.

8 Claims, 5 Drawing Sheets

1. Pump
2. Inlet
3. Air Pressure Gauge
4. Air Connection
5. Air Flow Meter
6. Pump Pressure Gauge
7. Discharge Flow Valve
8. Starter

NANOBUBBLES AND GAS-LIQUID MIXTURES FOR ENHANCED CARBON DIOXIDE SEQUESTRATION

CROSS REFERENCE TO RELATED APPLICATION

The present application claims benefit of priority to U.S. Provisional Application No. 63/303,060 having a filing date of Jan. 26, 2022 which is incorporated herein by reference in its entirety.

FIELD OF THE INVENTION

The present invention relates to an environmental solution relying on $CO_2$ storage and enhanced $CO_2$ mineralization in mafic and ultramafic rocks. More specifically, the present invention relates to an enhanced method for $CO_2$ storage and mineralization by forming nanobubbles of $CO_2$ gas in a fluid mixture that is injected through a borehole into a geological formation for mineralisation and/or storage.

BACKGROUND

The race to enhancing and increasing the removal of $CO_2$ from the environment is leading to a number of innovations in this area, from rapid removal from the atmosphere to removal from subsurface storage to removing from industrial applications. Innovation in the various means of measurement of rate and quantity of mineralized and stored $CO_2$ is also a related area.

The oceans take up $CO_2$ from the atmosphere and are responsible for absorbing around a third of the $CO_2$ emitted by fossil fuel burning, deforestation, and cement production since the industrial revolution (Sabine et al. 2004). While this is beneficial in terms of limiting the rise in atmospheric $CO_2$ concentrations and hence greenhouse warming, there are direct consequences for ocean chemistry. Ocean acidification describes the lowering of seawater pH and carbonate saturation that result from increasing atmospheric $CO_2$ concentrations. There are also indirect and potentially adverse biological and ecological consequences of the chemical changes taking place in the ocean now and as projected into the future (Barker et al. 2012). Enhanced $CO_2$ mineralization is a recognized way to store and or mineralise $CO_2$ underground or above ground. There is a need for an innovative process for $CO_2$ gas-liquid injection for underground storage and/or mineralisation which may provide for much higher mass transfer ratios and buffer capacities when compared to traditional technologies, thereby increasing dissolution rates and concentrations of $CO_2$ within a fluid-mixture.

The present disclosure provides a method wherein nanobubbles of $CO_2$ gas are injected and dissolved on-surface (e.g., above ground) in a storage tank or injection pipes. Compared to traditional sparging technologies that often result in gas bubble sizes in the micron level, this method proved to be more efficient. Micron-sized bubbles proved to be challenging to handle during on-surface sparging because of the larger size of these bubbles, there is a higher potential for coalescence of micron-sized bubbles to take place while injected into a fluid stream. Coalescence would in turn result in the formation of even increasingly larger bubble sizes. These coalesced larger bubble sizes would rise faster and quickly to the surface of the injection fluid. Once at the surface of the fluid, these bubbles would burst due to buoyancy effect, releasing the $CO_2$ back into atmosphere resulting in decreased efficiency of $CO_2$ mineralization. This is highly challenging to control when injecting large volumes of $CO_2$ rich fluids at greater depths due to increasing hydrostatic pressures. However, with the proposed $CO_2$ gas-liquid injection process for underground $CO_2$ storage and/or mineralization, there is a reduced effect of coalescence and buoyancy as the $CO_2$ is injected as nanobubbles and dissolved into a pressurized fluid-mixture stream.

The present process provides for several advantages over existing technologies since it provides higher mass transfer rate; thermodynamically metastable bubbles that can remain suspended in fluids for extended periods of time; higher buffer capacities; higher $CO_2$ mineralisation or storage volumes; less depth of $CO_2$ injection; and less fluid to be injected.

SUMMARY

One embodiment of the present disclosure is drilling vertical and/or horizontals wells into mafic or ultramafic rock formation and injecting water rich of nanobubbles of $CO_2$ to react with said rocks producing carbonate rocks and therefore permanently entrapping $CO_2$.

Another embodiment of the present disclosure is a method to decrease the amount of fluid required to achieve $CO_2$ mineralization. By utilizing nanobubbles, higher $CO_2$ concentration can be obtained in the same volume of fluid resulting in an enhanced efficiency due to increased mass transfer properties. It also means that injection depths can be shallower making it more feasible to store/mineralize $CO_2$.

BRIEF DESCRIPTION OF THE DRAWINGS

The drawings show embodiments of the disclosed subject matter for the purpose illustrating the invention. However, it should be understood that the present application is not limited to the precise arrangements and instrumentalities shown in the drawings, wherein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or".

Figure 1:
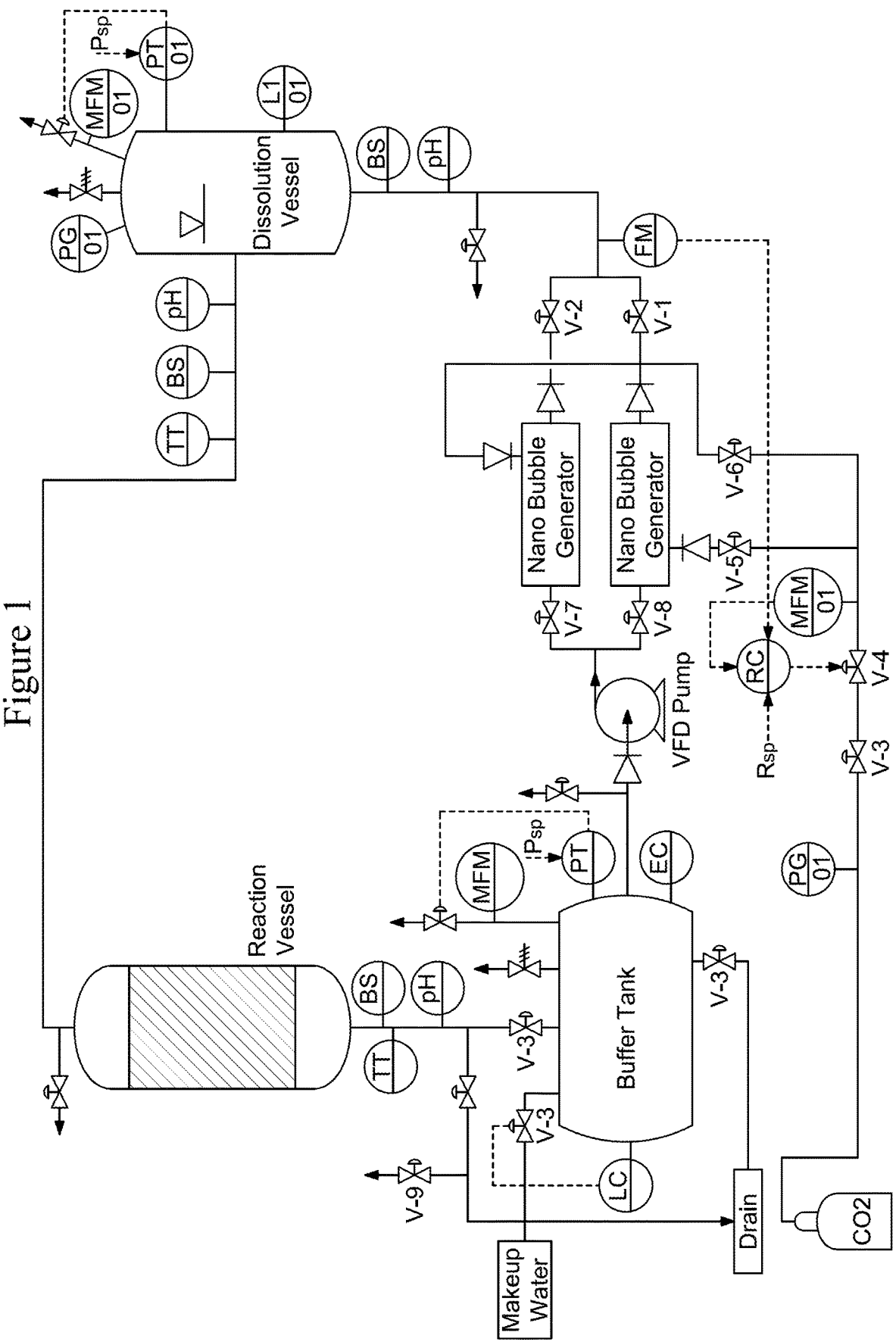
FIG. 1 is a process flow diagram of an embodiments of the disclosed subject matter.

Referring now to FIG. 1, the embodiments described include a process for dispersing $CO_2$ gas into a fluid for the purpose of forming nanobubbles. Exemplary laboratory and/or field trial scale processes can utilize a fluid mixture that is originally stored on-surface and is pumped at a pressure of about 10 bar, $CO_2$ injection mass flow rate of about 0.46 g/s, $H_2O$ injection flow rate of about 0.15 l/s and an injection depth of about 110 mbgl into the injection well. Other conditions such as a pressure of 5-50 bar preferably 10-40 bar of 15-30 bar, a $CO_2$ injection mass flow rate of 0.05-5 g/s, preferably 0.25-2.5 g/s or 0.5-1.5 g/s, an H2O injection flow rate of 0.5-10 l/s, 1-5 l/s or about 2.5 l/s, and an injection depth of 25-1000 mbgl, 50-500 mbgl or about 100 mbgl can also be used. A pressurized $CO_2$ (about 50 bar preferably 5-1000 bar, 10-500 bar or 100-25 bar) is regulated through a manifold and set of mass flow controllers prior to injection into the pressurized fluid mixture stream. Calculated mass flow set points control the overall $CO_2$ injection process in relation to fluid mixture flows. For an example, to inject 1 metric tonne of $CO_2$ per day at 900 mbgl zone, a fluid mixture flow rate of 18 l/min and 40 bar pressure are preferably used. These values (e.g., pressure, $CO_2$ injection mass flow rate, $H_2O$ injection flow rate, injection depth, mass flow set points, and fluid mixture flow rate of 18 are exemplary and can be scaled upwards for commercial scale process by factors of 10×, 100×, 1,000×, 10,000× and/or 100,000×.

Figure 2:
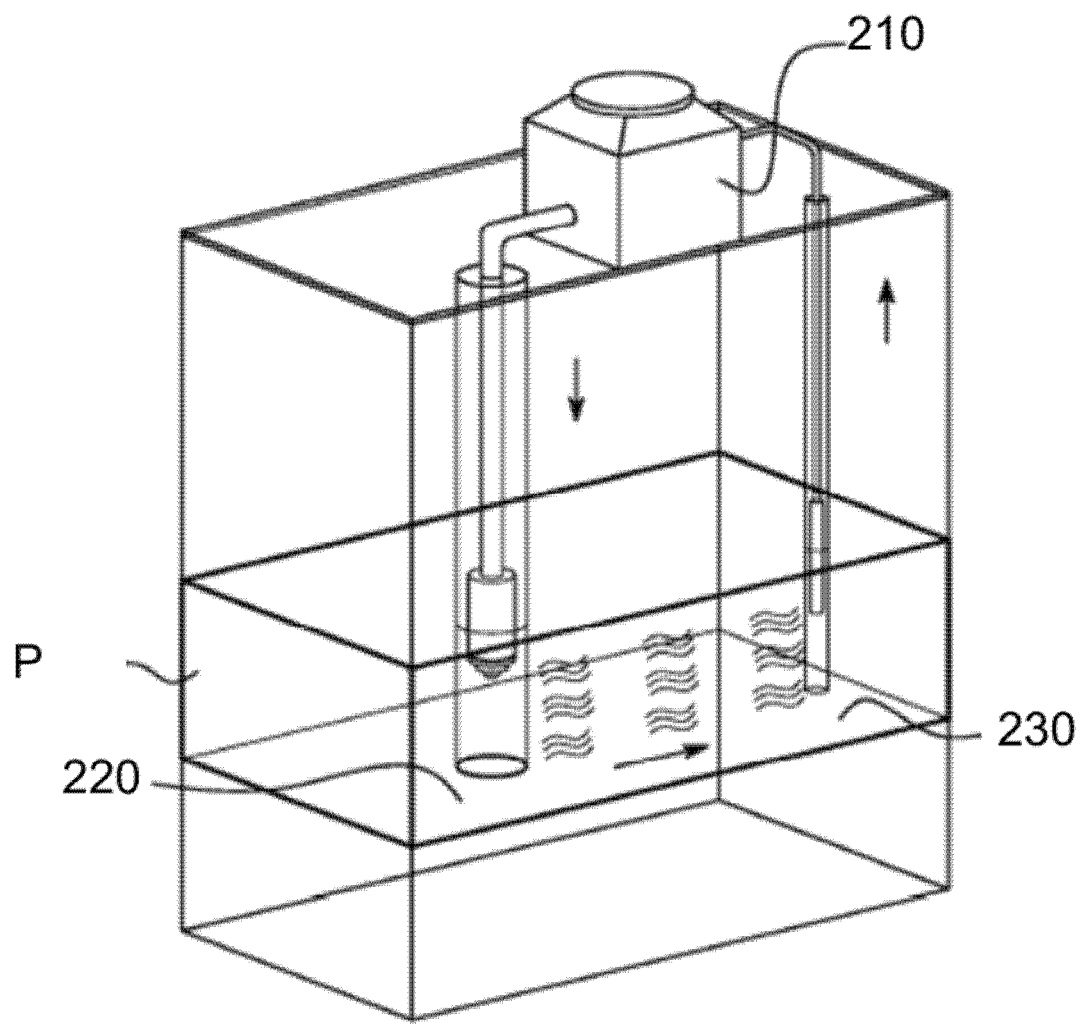
FIG. 2 is a schematic representation of an embodiment of the disclosed subject matter.
Figure 3:
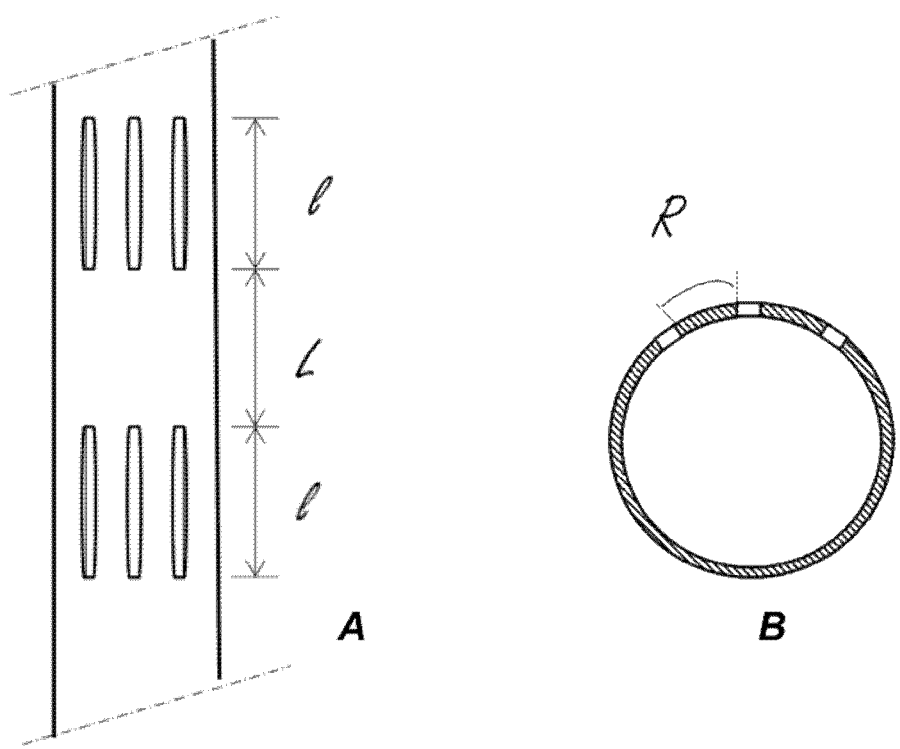
FIG. 3 is a schematic representation of an embodiment of the disclosed subject matter.

Referring to FIG. 2, some embodiments of the disclosed invention include a water looping system having a water storage module (210), a carbon dioxide injection module and injection well (220), a mafic or ultramafic formation, here schematically illustrated as a horizontal layer (P), and an observation well module (230) for monitoring and controlling carbonation reactions. The process begins by identifying a suitable location with the rock layer being preferably at least 0.1 km thick or at least 0.5 km thick. An injection borehole is drilled into this rock layer. Said borehole is preferably at least 0.5 km deep and up to a maximum of 1.8 km in depth with the preferred depth being between 0.8 to 1.2 km deep or about 1 km mbgl. An observation borehole is drilled alongside the injection borehole with hydraulic connection between the two holes. The injection borehole is fitted with an engineered well casing (preferably steel or concrete) which is perforated at the targeted areas for mineralization in the geological formation (see FIG. 3. and the text further below for more details). In the continuous injection process water is first pumped from the observation borehole or another source to a buffer storage tank on surface. The buffer tank is fitted to receive water from different sources such as underground water resources, sea water, treated water etc. The water, at ambient temperature, is then pumped at pressure through the injection pipeline to the injection borehole well head by using a set of booster pumps. The formation temperature at 1 km depth is about 60-80° C. Pumping water to this formation will also help controlling the temperature at the target zone and, consequently, gives greater control over the reaction rate.

Figure 4:
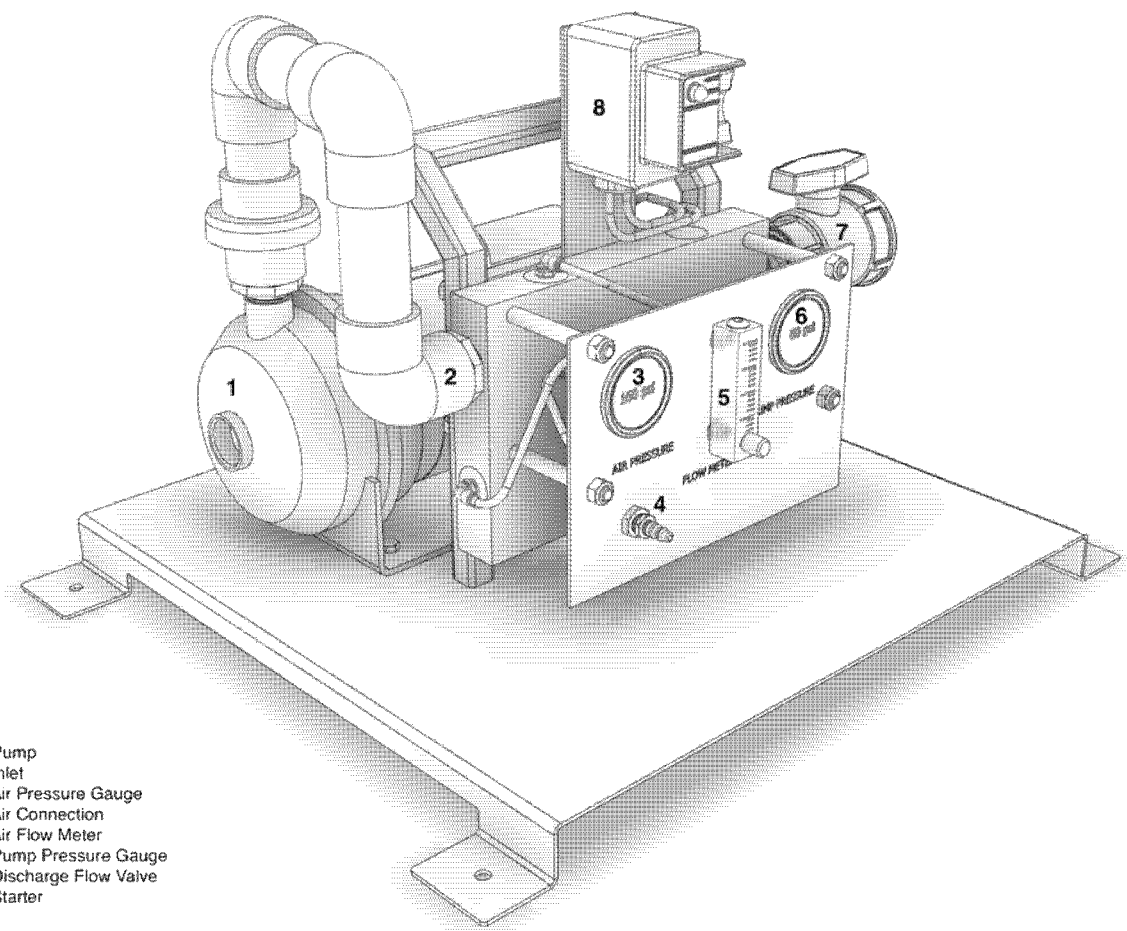
FIG. 4 is a schematic representation of an embodiment of the disclosed subject matter.

Referring to FIG. 4, the embodiment describes a nanobubble generator. The generator comprises a pump (1), an inlet (2), an air pressure gauge (3), an air connection (4), an air flow meter (5), a pump pressure gauge (6), a discharge flow valve (7), and a starter (8). The bubble generator typically operates at flow rate of 6-45 m³/hr and a maximum liquid pressure of 1.5 bar. Typical operating conditions include: temperature is 5-60° C., preferably 30-40° C., and $CO_2$ pressure of 1-8.5 bar, preferably 3-4 bar.

Another embodiment of the present disclosure is a programmable logic controller that automates the $CO_2$ injection process by controlling the $CO_2$ mass flow controllers, fluid-mixture booster pumps and respective valves to enhance $CO_2$ mass transfer ratios into the fluid mixture stream and achieving maximum buffer capacities per unit volume.

In an embodiment of this disclosure, the proposed gas-liquid injection process of the present invention dissolves bubble sizes of 10-900 nm, 25-750 nm or 50-500 nm, preferably 60-550 nm in average diameter in fluid-mixtures. The bubbles are neutrally buoyant and can remain suspended in fluids for a period of time from 15 days up to 3 months without rising to the surface. This allows for shallower injection, higher gas transfer ratio, as well as increased $CO_2$ concentration in fluids. Studies have shown an enhanced mass transfer coefficients of 0.35 If which is 11 fold better than regular bubble sizes, e.g., bubbles having an average diameter in the micron range.

Figure 5:
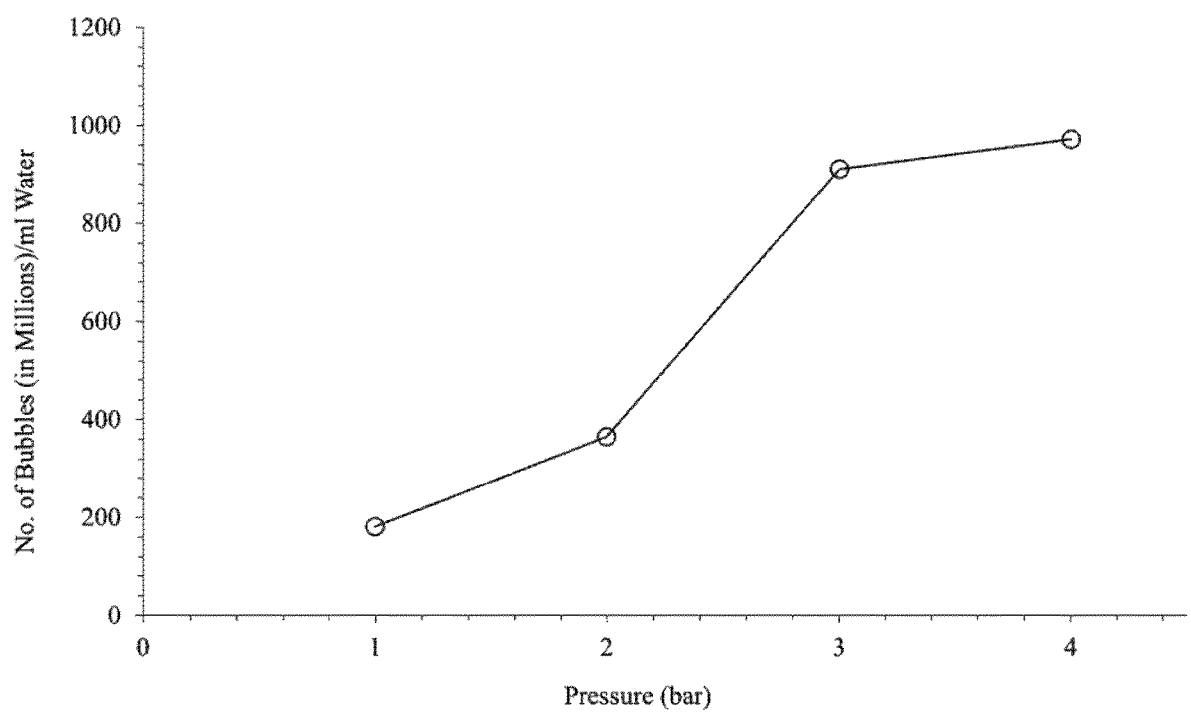
FIG. 5 is a schematic representation of an embodiment of the disclosed subject matter.

In a further preferred embodiment of the present disclosure, $CO_2$ gas-liquid injection relies on nanobubble membrane generators that generate billions of $CO_2$ bubbles. Referring to FIG. 5, at 2 barG average count is 3.66×10^8 bubbles per ml; at 3 barG average count was 9.1×10^ 8 bubbles per ml; and at 4 barG average count was 9.71×10^8 bubbles per ml. A nanoparticle analyser is used to measure average bubbles number and size through Brownian motion estimations. The analyser incorporates three lasers with different wavelengths and a colour camera to visualize the displacement of bubbles from 10 nm to 15 microns. Displacement is interpreted as Brownian motion, or, for larger bubbles, settling or creaming and can therefore be readily converted to particle size for each bubble, allowing high-resolution size distribution analysis. Same technique is also used to measure average bubbles number and density for specific volume of fluid. The analyser uses a cuvette that includes a black insert which houses a magnetic stir bar to keep larger bubbles suspended and mix the bubbles between videos. Samples are continuously collected from nanobubble membrane generators and transferred directly into the system cuvette without further preparation to measure average bubbles size and density.

The nanobubbles are then injected at high pressure (>25 bar) into a fluid-mixture. The generated nanobubbles' buoyancy is insignificant allowing for extended suspension within a fluid resulting in increased mass transfer within the fluid. The nanobubbles are thermodynamically metastable allowing for high residence time in fluids up to a few months.

Mafic and ultramafic rocks can contain silicate minerals including olivine, serpentine, pyroxene and plagioclase. Olivine rocks often contain magnesium, oxygen, and silicon. Olivine is the most abundant mineral in the earth's mantle until a depth of 700 km. The composition is usually a combination of $SiO_4$ and $Mg^{2+}$ and minor $Ca^{2+}$. Typically, silicon bonds with 4 oxygen molecules forming a pyramid structure so that the charges of cations and anions are balanced, and $Mg^{2+}$ occupies the empty space between the $SiO_4$ structure. These bonds can be easily triggered to react with carbonic acid. The reaction of olivine with $CO_2$ can be accomplished by the following reaction pathway:

$$MgSiO_4 + 2\ CO_2 \rightarrow 2\ MgCO_3 + SiO_2 \qquad [1]$$

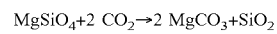

It is also proven that the rate of reaction increases significantly by introducing water. Water helps $CO_2$ to be solubilized forming carbonic acid and therefore making the mineralization and ion exchange process far easier and more efficient. Below is the reaction pathway in presence of water:

$$CO_2 + H_2O \rightarrow H_2CO_3 \rightarrow H^+ + HCO_3^- \quad [2]$$

$$Mg_2SiO_4 + 4H^+ \rightarrow Mg_2^{++} + SiO_2 + 2H_2O \quad [3]$$

$$Mg^{2+} + HCO_3^- \rightarrow MgCO_3 + H^+ \quad [4]$$

Some mafic and ultramafic rocks contain mainly the mineral's olivine and pyroxene. In the presence of water and $CO_2$, the following reaction occurs:

$$4Mg_2SiO_4(\text{olivine}) + CaMgSi_2O_6(\text{pyroxene}) + CO_2 + 7H_2O \rightarrow 3Mg_3Si_2O_5(OH)_4(\text{serpentine}) + CaCO_3 \text{(calcite)} \quad [5]$$

Another aspect concerns a method for carbon dioxide sequestration utilizing pyroxene minerals. Pyroxene is one of the groups in an inosilicate mineral, which is also abundantly found out in mafic and ultramafic rocks. The general chemical formula for pyroxene is $AB(Si)_2O_6$, in which A can be one of the ions like magnesium, aluminum, etc. Most commonly, pyroxene can often be found as $Mg_2SiO_4$ and $CaMgSi_2O_6$. Naturally, pyroxenes react with $CO_2$ according to the following equations:

$$Mg_2SiO_4 + 2CO_2 \rightarrow 2MgCO_3 + SiO_2 \quad [6]$$

$$CaMgSi_2O_6 + 2CO_2 \rightarrow CaMg(CO_3)_2 + 2SiO_2 \quad [7]$$

However, similar to olivine, water increases the rate of reaction, therefore, in presence of water, below is the reaction pathway for $CO_2$-pyroxenes reaction:

$$4Mg_2SiO_4 + CaMgSi_2O_6 + CO_2 + 6H_2O \rightarrow 3Mg_3Si_2O_5(OH)_4 + CaCO_3 \quad [8]$$

$$CaAl2Si2O8 + CO2 + 2H2O \rightarrow CaCO3 + Al2Si2O5(OH)4 \quad [9]$$

The present disclosure relates to a method that utilizes the above reaction pathways (especially equations 2-9) to convert and/or store $CO_2$ into mafic and ultramafic rocks, as defined above, as a first aspect of the invention. The proposed method also enhances the above reaction rates leading to complete mineralization of total injected $CO_2$ volumes within two to twelve months from injection. The invention also discloses various operating conditions such as temperature, pressure, flowrate (depends on rock permeability), etc. that affect the process efficiency, and at which improved sequestration is obtained. Some embodiments of the present invention also cover engineering aspects such as utilizing renewable energy, water looping, and process configuration and design.

The invention claimed is:

1. A method of carbon dioxide mineralization and storage, comprising:

generating $CO_2$ nanobubbles with a nanobubble membrane generator;

injecting said $CO_2$ nanobubbles as a carbon dioxide and fluid mixture into a rock formation comprising mafic or ultramafic rock via an injection well wherein the carbon dioxide and fluid mixture is flowed through said injection well or an injection well tubing disposed in the rock formation, the injection well and/or injection well tubing having a plurality of longitudinal perforations at a depth of 0.4 to 4 km in said rock formation;

reacting carbon dioxide in said carbon dioxide and fluid mixture with said rock formation to form calcites and magnesites in the rock formation; and recycling at least a portion of the fluid from said rock formation via an observation well.

2. The method of carbon dioxide mineralization and storage of claim 1, wherein said membrane generator comprises:

a pump;
an inlet;
an air pressure gauge;
an air connection;
an air flow meter;
a pump pressure gauge;
a discharge flow valve; and
a starter.

3. The method of carbon dioxide mineralization and storage of claim 2, wherein the $CO_2$ nanobubbles have an average diameter of about 60-550 nm.

4. The method of carbon dioxide mineralization and storage of claim 3, wherein the $CO_2$ nanobubble generator operates at a pressure of at least 25 bar.

5. The method of carbon dioxide mineralization and storage of claim 4, wherein said fluid mixture comprises at least one selected from the group consisting of water, seawater, brackish water, and conservative tracer.

6. The method of carbon dioxide mineralization and storage of claim 1, wherein said injection and observation wells have the same depth.

7. The method of carbon dioxide mineralization and storage of claim 4, wherein during the injecting, a high-pressure zone is created within said injection well below a packed off interval and a low-pressure zone is created during the recycling through the observation well.

8. The method of carbon dioxide mineralization and storage of claim 5, wherein the carbon dioxide and fluid mixture flows from a high-pressure zone to a low-pressure zone and a fluid volume of the carbon dioxide and fluid mixture is recycled back through the observation well.

* * * * *